United States Patent
Yaoi et al.

(10) Patent No.: US 8,871,351 B2
(45) Date of Patent: Oct. 28, 2014

(54) EASY-OPEN END

(75) Inventors: Etsuko Yaoi, Yokohama (JP); Kazuhiro Sato, Yokohama (JP); Go Fukui, Yokohama (JP); Toshio Sue, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1676 days.

(21) Appl. No.: 12/162,670

(22) PCT Filed: Feb. 9, 2007

(86) PCT No.: PCT/JP2007/052807
§ 371 (c)(1),
(2), (4) Date: Jul. 30, 2008

(87) PCT Pub. No.: WO2007/091740
PCT Pub. Date: Aug. 16, 2007

(65) Prior Publication Data
US 2009/0226745 A1    Sep. 10, 2009

(30) Foreign Application Priority Data
Feb. 9, 2006    (JP) .................................. 2006-031862

(51) Int. Cl.
| | | |
|---|---|---|
| B32B 15/04 | (2006.01) | |
| B65D 17/32 | (2006.01) | |
| B32B 15/08 | (2006.01) | |
| B65D 17/00 | (2006.01) | |
| C23C 22/34 | (2006.01) | |
| B32B 27/36 | (2006.01) | |
| C23C 22/36 | (2006.01) | |
| B32B 7/12 | (2006.01) | |

(52) U.S. Cl.
CPC .............. *B32B 15/08* (2013.01); *B65D 17/165* (2013.01); *C23C 22/34* (2013.01); *B65D 2517/0082* (2013.01); *B32B 27/36* (2013.01); *B65D 2517/0062* (2013.01); *C23C 22/361* (2013.01); *B65D 2517/0014* (2013.01); *B32B 7/12* (2013.01)
USPC ........................................ 428/457; 428/411.1

(58) Field of Classification Search
None
See application file for complete search history.

(56) References Cited

U.S. PATENT DOCUMENTS 4,397,401 A * 8/1983 Ueno et al. ..................... 220/260
5,112,695 A * 5/1992 Watanabe et al. ............. 428/458

(Continued)

FOREIGN PATENT DOCUMENTS

EP    1 780 312 A1    5/2007
JP    59-93636         5/1984

(Continued)

OTHER PUBLICATIONS

Wang, Yong-Xia, Synthesis and Properties of New Thermoplastic Polymers from Substituted 3,4-Dihydro-2H-1,3-benzoxazines, 2000, Macromolecules, vol. 33, pp. 2839-2847.*

(Continued)

*Primary Examiner* — Callie Shosho
*Assistant Examiner* — Patrick English
(74) *Attorney, Agent, or Firm* — Sughrue Mion, PLLC (57) ABSTRACT

An easy-open end which is excellent from the standpoint of sanitation and environmental friendliness yet satisfying both the close adhesion and the scratch resistance despite of using a bisphenol A-free primer. The easy-open end has a polyester film applied, via a primer, onto the inner surface of the end of an aluminum base sheet forming a surface-treating layer that contains a zirconium compound and/or a titanium compound and an organic compound, wherein the primer contains a polyester resin that contains not less than 30% by weight of a carboxyl group-introduced polyester resin, and a phenol resin at a weight ratio of 50:50 to 85:15.

5 Claims, 1 Drawing Sheet

(56) References Cited

U.S. PATENT DOCUMENTS

| | | | |
|---|---|---|---|
| 5,116,651 A * | 5/1992 | Katsura et al. | 428/35.7 |
| 6,369,149 B1 * | 4/2002 | Yoshida et al. | 524/417 |
| 6,472,480 B1 * | 10/2002 | Anderson | 525/437 |
| 2005/0014012 A1 | 1/2005 | Stapperfenne et al. | |

FOREIGN PATENT DOCUMENTS

| | | | |
|---|---|---|---|
| JP | 59-093636 A | | 5/1984 |
| JP | 11229156 A | | 8/1999 |
| JP | 2000-006979 A | | 1/2000 |
| JP | 2000-202944 A | | 7/2000 |
| JP | 2000-202945 A | | 7/2000 |
| JP | 2000202944 A | * | 7/2000 |
| JP | 2005-126097 A | | 5/2005 |
| JP | 2005-126755 A | | 5/2005 |
| JP | 2005126755 A | * | 5/2005 |

OTHER PUBLICATIONS

Jackson et al., Carboxylated Polyester Additives for Improving the Adhesion of Coatings, 1971, Eastman Kodak Co., pp. 1-10.*

* cited by examiner

EASY-OPEN END

TECHNICAL FIELD

The present invention relates to an easy-open end. More specifically, the invention relates to an easy-open end which is excellent from the standpoint of sanitation and environmental friendliness, has excellent corrosion resistance and can be excellently unsealed.

BACKGROUND ART

A so-called easy-open end has heretofore been extensively used as a container end that can be easily unsealed by hand without using any particular utensil. From the standpoint of workability, the container end is obtained by using a resin-coated metal sheet which has a resin coating such as polyester film applied onto a surface-treated steel plate such as tin plate or TFS, or an aluminum alloy as a metal blank, by providing the container end of the metal sheet with a score extending on the way in the direction of thickness of the metal plate to sectionalize the portion for forming an opening, by forming a rivet by using the end sheet itself in the portion for forming the opening, and by fixing a pull tab by the rivet. The container end is double-seamed with a flange such as a can body member.

The easy-open end using an aluminum alloy sheet is, usually, advantageous from the standpoint of workability and retaining flavor accompanied, however, by a problem of inferior corrosion resistance to that of the surface-treated steel members. Therefore, the aluminum alloy sheet has heretofore been treated for its surfaces chiefly with chromic phosphate. However, the solution used for the treatment with the chromic phosphate contains hexavalent chrome which is a harmful substance. From the environmental point of view, therefore, it has been desired to conduct a surface treatment that substitutes for the treatment with the chromic phosphate.

In order to solve the above problem, various resin-coated aluminum sheets have been proposed being subjected to the non-chromium type surface treatment. For example, JP-A-2005-126097 is proposing a resin-coated aluminum alloy sheet forming an organic/inorganic composite surface-treating layer containing a zirconium compound and/or a titanium compound, an organic phosphonic acid compound and tannin, and coated with a polyester film via an epoxyphenol resin type adhesive primer.

DISCLOSURE OF THE INVENTION

The above resin-coated aluminum alloy sheet is excellent from the standpoint of corrosion resistance and close adhesion, but is not still satisfactory since it uses an epoxyphenol type primer. That is, the epoxyphenol type primer usually contains bisphenol A. When the easy-open end used for food is subjected to a high-temperature heat treatment such as retort sterilization, it is considered that the bisphenol A may elute out. From the standpoint of sanitation, therefore, it is desired to use a primer that does not contain the bisphenol A.

In the use of the easy-open end having a score formed in the surface of the end, however, none of the other primers are capable of simultaneously satisfying both the close adhesion and the scratch resistance. In particular, close adhesion is not accomplished in the score portion, and the corrosion resistance is degraded.

It is therefore an object of the present invention to provide an easy-open end which is excellent from the standpoint of sanitation and environmental friendliness yet satisfying both the close adhesion and the scratch resistance despite of using a bisphenol A-free primer.

According to the present invention, there is provided an easy-open end having a polyester film applied, via a primer, onto the inner surface of the end of an aluminum base sheet forming a surface-treating layer that contains a zirconium compound and/or a titanium compound and an organic compound, wherein the primer contains a polyester resin that contains not less than 30% by weight of a carboxyl group-introduced polyester resin, and a phenol resin at a weight ratio of 50:50 to 85:15.

In the easy-open end of the present invention, it is desired that:

1. The carboxyl group-introduced polyester resin has not less than two carboxylic anhydride groups in a molecule thereof;
2. The carboxyl group-introduced polyester resin has an acid value of 150 to 800 meq/kg;
3. The phenol resin is an m-cresol resole type phenol resin;
4. The surface-treating layer is an organic/inorganic composite surface-treating layer containing the zirconium compound in an amount of 2 to 20 mg/m$^2$ calculated as zirconium atoms, the phosphorus compound in an amount of 1 to 10 mg/m$^2$ calculated as phosphorus atoms, and the organic compound in an amount of 5 to 60 mg/m$^2$ calculated as carbon atoms, the organic compound is an organic polymer having a structural unit represented by the following formula (1), wherein φ is a benzene ring, and X is a hydrogen atom or a group Z represented by the following formula (2), wherein R$_1$ and R$_2$ are hydrogen atoms, alkyl groups having 1 to 10 carbon atoms or hydroxyalkyl groups having 1 to 10 carbon atoms, the introduction ratio of the groups Z being 0.3 to 1.0 groups per a benzene ring, and when Xs are all hydrogen atoms, the organic polymer has an average molecular weight of 1,000 to 100,000; and 5. The surface-treating layer is an organic/inorganic composite surface-treating layer containing the zirconium compound and/or the titanium compound in an amount of 4 to 30 mg/m$^2$ calculated as zirconium atoms and/or titanium atoms, the organic phosphonic acid compound in an amount of 0.2 to 9 mg/m$^2$ calculated as phosphorus atoms, and the tannin in an amount of 2 to 90 mg/m$^2$ calculated as carbon atoms.

The present invention uses a chromium-free surface-treated aluminum base sheet and a bisphenol A-free primer making it possible to provide an easy-open end which is excellent from the standpoint of environmental friendliness and sanitation.

Despite of containing no bisphenol A, the primer used in the present invention makes it possible to closely apply the polyester film onto the surface-treated aluminum base sheet and to obtain excellent adhesion even in the score portion and, therefore, to provide an easy-open end that satisfies both close adhesion and scratch resistance.

In the present invention, further, the polyester film is applied by using a particular primer onto an aluminum alloy sheet on which a particular organic/inorganic composite surface-treating layer is formed to improve close adhesion between the primer and the surface-treating layer and between the primer and the polyester film, exhibiting excellent and close adhesion even on the score portion after the retort treatment enabling the end to be excellently opened and effectively preventing the occurrence of feathering at the time of opening. Moreover, the easy-open end of the invention exhibits excellent corrosion resistance.

BEST MODE FOR CARRYING OUT THE INVENTION

In the easy-open end of the present invention, an important feature resides in the use of a primer which contains a polyester resin that contains not less than 30% by weight of a carboxyl group-introduced polyester resin, and a phenol resin at a weight ratio of 50:50 to 85:15 in applying a polyester film onto the aluminum base sheet forming a surface-treating layer that contains a zirconium compound and/or a titanium compound and an organic compound.

The surface-treated aluminum base sheet used in the present invention is forming a surface-treating layer that contains the zirconium compound and/or the titanium compound and the organic compound, exhibits excellent corrosion resistance and close adhesion to the coated resin despite of containing no chromium, and exhibits excellent corrosion resistance and close adhesion even in a portion where the score is formed.

Further, the primer used in the present invention contains no bisphenol A and is excellent from the standpoint of sanitation and, further, comprises chiefly a polyester resin, exhibiting excellent and close adhesion to the polyester film and, therefore, exhibiting excellent and close adhesion compounded by the effect of the above surface-treating layer.

(Aluminum Base Sheet)

As the aluminum base sheet used in the present invention, there can be used pure aluminum or an aluminum alloy of aluminum and other metal for forming alloy, such as magnesium or manganese in small amounts. From the standpoint of corrosion resistance, strength and workability, it is particularly desired to use an aluminum alloy sheet containing 0.2 to 5.5% of Mg, 0.05 to 1% of Si, 0.05 to 1% of Fe, 0.01 to 0.35% of Cu, 0.01 to 2.0% of Mn and 0.01 to 0.4% of Cr all on the weight basis.

If the amount of Mg is not smaller than 5.5% by weight, the workability of the material is deteriorated. If the amount of Mg is not larger than 0.2% by weight, the material lacks strength. If the amount of Si is not smaller than 1.0% by weight, the workability is deteriorated and the corrosion resistance decreases, too. If the amount of Fe is not smaller than 1.0% by weight, the workability is deteriorated and the corrosion resistance decreases, too. If the amount of Cu is not smaller than 0.35% by weight, cracks develop at the time of casting. If the amount of Cr is not smaller than 0.4% by weight and the amount of Mn is not smaller than 2.0% by weight, cracks develop in the step of producing the ends.

It is, usually, desired that the aluminum blank has a thickness of 0.15 to 0.40 mm and, particularly, 0.20 to 0.30 mm. If the thickness is smaller than 0.15 mm, it is difficult to form the end and, besides, a desired end strength is not obtained. If the thickness exceeds 0.40 mm, on the other hand, it becomes disadvantageous from the standpoint of economy.

(Organic/Inorganic Composite Surface-Treating Layer)

In order to improve the corrosion resistance and close adhesion of the polyester film, the present invention forms, on the aluminum base sheet, an organic/inorganic composite surface-treating layer containing a zirconium compound and/or a titanium compound and an organic compound. The inorganic component in the organic/inorganic composite surface-treating layer contributes chiefly to the close adhesion to the aluminum alloy base sheet. The organic component in the organic/inorganic composite surface-treating layer contributes chiefly to the close adhesion to the primer resin. Therefore, the close adhesion is improved among the aluminum alloy base sheet, the organic/inorganic composite surface-treating layer, the primer resin layer and the polyester film.

As an upper layer of the organic/inorganic surface-treating layer, further, there may be formed a film of an organic compound such as a tannin layer. Or, as a lower layer of the organic/inorganic surface-treating layer, there may be formed an inorganic surface-treating layer containing, for example, a zirconium compound and/or a titanium compound.

It is desired that the organic compound used in the organic/inorganic surface-treating layer or used as the upper layer of the organic/inorganic surface-treating layer comprises a water-soluble phenol compound. The water-soluble phenol compound improves the close adhesion to the phenol resin which is one of the components of the primer used in the invention. Moreover, the polyester resin which is another component of the primer used in the invention improves the close adhesion to the polyester film. Therefore, the close adhesion is improved as a whole.

Described below are an organic/inorganic composite surface-treating layer I and an organic/inorganic composite surface-treating layer II which are the preferred organic/inorganic composite surface-treating layers.

[Organic/Inorganic Composite Surface-Treating Layer I]

The organic/inorganic composite surface-treating layer I contains the zirconium compound in an amount of 2 to 20 mg/m² calculated as zirconium atoms, the phosphorus compound in an amount of 1 to 10 mg/m² calculated as phosphorus atoms, and the organic compound in an amount of 5 to 60 mg/m² calculated as carbon atoms, the organic compound is an organic polymer having a structural unit represented by the following formula (1), wherein φ is a benzene ring, and X is a hydrogen atom or a group Z represented by the following formula (2), wherein $R_1$ and $R_2$ are hydrogen atoms, alkyl groups having 1 to 10 carbon atoms or hydroxyalkyl groups having 1 to 10 carbon atoms, the introduction ratio of the groups Z being 0.3 to 1.0 group per a benzene ring, and when Xs are all hydrogen atoms, the organic polymer has an average molecular weight of 1,000 to 100,000.

It is desired that the organic/inorganic composite surface-treating layer is formed by using an organic compound which is an organic polymer represented by the above formula (1).

In the present invention, in particular, it is desired that $R_1$ and $R_2$ in the above formula (2) are hydrogen atoms, alkyl groups having 1 to 10 carbon atoms or hydroxyalkyl groups having 1 to 10 carbon atoms. If the alkyl groups or the hydroxyalkyl groups have not less than 11 carbon atoms, microporous portions increase; i.e., a dense film is not formed and the corrosion resistance decreases. Besides, lengthened alkyl groups exhibit hydrophobic property, and the adhesion to the film is weakened.

It is desired that the introduction ratio of the groups Z represented by X is 0.3 to 1.0 groups per a benzene ring. The adhesion is not sufficient if the introduction ratio of the groups Z is smaller than 0.3.

The introduction ratio of the groups Z is calculated by an ordinarily employed method and is not particularly limited. For example, the organic compound is completely burned by the CHNS—O elemental analysis, the elements are determined by measuring the formed gases ($CO_2$, $H_2O$, $N_2$, $SO_2$), and the introduction ratio is calculated from the results of determination.

When Xs are all hydrogen atoms, it is desired that the organic polymer has a molecular weight in a range of 1,000 to 100,000 and, particularly, 1,000 to 10,000. If the molecular weight is less than 1,000, the product formed by heating lacks flexibility, develops aggregation breakdown in the organic/inorganic composite film at the time of working, and the adhesion becomes insufficient. If the molecular weight is not smaller than 100,000, the reaction is not sufficient with the inorganic component that constitutes the film, and the corrosion resistance becomes poor.

The organic polymer may be of a single kind of polymer having a single kind of average molecular weight or may be a mixture of two or more polymers having different average molecular weights.

The molecular weight can be measured by the gel permeation chromatography after the film has been exfoliated.

The amount of the organic polymer in the organic/inorganic composite film affects the corrosion resistance and the close adhesion. It is desired that the amount of the organic polymer is in a range of 5 to 60 $mg/m^2$ calculated as carbon atoms. If the amount of carbon is less than 5 $mg/m^2$, the surface of the aluminum alloy is not covered to a sufficient degree, and the adhesion and the corrosion resistance are not satisfactory. There is no problem in the properties even if the amount of carbon exceeds 60 $mg/m^2$. In this case, however, the appearance may vary undesirably and the cost increases.

The amount of carbon can be measured by using a surface carbon analyzer that is placed in the market. The surface carbon analyzer is based on a principle of elevating the temperature of a sample, gasifying the carbon present on the surface by oxidation, and determining the gas by IR (infrared ray absorption). The measuring condition is to gasify the carbon on the surface by oxidation. Usually, the measurement is taken under the conditions of 400 to 500° C. for 5 to 10 minutes.

The polymer represented by the formula (1) can be produced by a customary method. For example, the polymer represented by the formula (1) is produced by polycondensing a phenol compound or a naphthol compound with a formaldehyde and, thereafter, introducing a functional group X by using the formaldehyde and amine. As the formaldehyde, formalin is usually used. There is no particular limitation on the molecular weight of the polymer. When Xs are all hydrogen atoms, however, it is desired that polymer has a molecular weight, usually, in a range of about 1,000 to about 100,000 and, particularly, about 1,000 to about 10,000.

The organic/inorganic composite surface-treating layer I contains a zirconium compound. The amount of the zirconium compound affects the corrosion resistance and close adhesion. It is desired that the amount of the zirconium compound in the layer is in a range of 2 to 20 $mg/m^2$ calculated as zirconium atoms. If the amount of zirconium is less than 2 $mg/m^2$, the surface of the aluminum alloy is not covered to a sufficient degree like the case of carbon described above, and the corrosion resistance is not sufficient. If the amount thereof exceeds 20 $mg/m^2$, aggregation breakdown easily occurs in the surface-treating film at the time of working, and the adhesion may become defective.

There is no particular limitation on the zirconium compound used for the above surface-treating layer provided it contains zirconium. Preferably, however, a water-soluble zirconium compound containing fluorine is used owing to its stable property at the pH and excellent film-forming property.

As the water-soluble zirconium compound containing fluorine, there can be used, for example, $H_2ZrF_6$, $(NH_4)_2ZrF_6$, $K_2ZrF_6$, $Na_2ZrF_6$ and $Li_2ZrF_6$ though there is no particular limitation. These compounds may be used in one kind or in a combination of two or more kinds.

The organic/inorganic composite surface-treating layer I contains a phosphorus compound. It is desired that the amount of the phosphorus compound in the layer is in a range of 1 to 10 $mg/m^2$ calculated as phosphorus atoms. If the amount of phosphorus is less than 1 $mg/m^2$, the corrosion resistance is not sufficient on account of the same reasons as the amount of zirconium. If the amount of phosphorus exceeds 10 $mg/m^2$, the adhesion may become defective.

It is desired that the phosphorus compound in the surface-treating film is a phosphoric acid type compound from the standpoint of improving the close adhesion between the organic resin layer and the metal material. As the phosphoric acid type compound used for the above object, there can be exemplified phosphoric acid or the salt thereof, a condensed phosphoric acid or the salt thereof, zirconium phosphate and titanium phosphate. Here, as the salt, there can be exemplified alkali metal salts such as ammonium salt, sodium salt and potassium salt.

Further, an organosilicon compound can be contained in an attempt to improve the close adhesion. As the organosilicon compound, there can be exemplified vinylethoxysilane, γ-aminopropyltriethoxysilane, N-(β-aminoethyl)-γ-aminopropyltriethoxysilane, γ-mercaptopropyltrimethoxysilane, γ-glycidoxypropyltrimethoxysilane and γ-methacryloxypropyltrimethoxysilane.

The amount of the zirconium compound and the amount of the phosphorous compound can be determined by using a fluorescent X-ray analyzer placed in the market. That is, a plurality of samples having zirconium or phosphorus in known amounts but in different amounts are measured, and a calibration curve of intensity vs. amount is drawn from the intensities thereof. A sample is cut from a coated metal material of the present invention and is measured under the same conditions. The measured intensity is converted into an amount based on the calibration curve to measure the amount of the zirconium compound and the amount of the phosphorus compound.

It is desired that the organic/inorganic composite surface-treating layer I has a thickness of 5 to 500 nm, preferably, 15 to 300 nm and, more preferably, 50 to 300 nm. If the film thickness is less than 5 nm, excellent adhesion to the laminated film is not obtained. If the film thickness exceeds 500 nm, the color tone of the metal material is highly likely to be spoiled.

It is further desired that the organic/inorganic composite surface-treating layer I is covering not less than 90% of the surface of the aluminum alloy material. If the covering ratio is less than 90%, the film tends to be exfoliated at the time of working.

The organic/inorganic composite surface-treating layer I can be determined for its thickness and covering ratio in a customary manner by using an XPS (X-ray photoelectron spectroscopic analyzing) apparatus. The XPS is an apparatus which excites a sample with X-rays in an ultra-high vacuum condition ($10^{-5}$ Pa or less) and analyzes photoelectrons that are emitted. The ratio of atoms present on the surface is calculated from the intensity of photoelectrons and the coefficient of sensitivity.

The film constituting the organic/inorganic composite surface-treating layer I can be obtained by applying an organic/inorganic composite surface-treating solution onto the aluminum alloy sheet.

The surface-treating solution is prepared by dissolving the above polymer, zirconium compound and phosphorus compound in water which is a solvent. Described below is how to prepare the treating solution.

As the surface-treating solution, a water-soluble polymer can be used for forming a film of the organic compound. It is desired that phosphoric acid ions and a complex fluoride of zirconium are made present therein. It is further desired to adjust a pH value at which the water-soluble polymer, phosphoric acid and complex fluoride can be easily precipitated. The treating solution is contacted to the aluminum alloy sheet. During the treatment, the surface of aluminum is etched with the fluorine compound and, at this moment, the pH value rises on the interface. Therefore, the water-soluble polymer and the phosphorous compound that are present undergo the precipitation on the surface to form a film. To remove the unreacted product, the surface-treated aluminum sheet is washed with water, and is further washed with pure water followed by drying to obtain a surface-treated aluminum alloy plate.

In the organic/inorganic composite surface-treating solution, it is desired that the concentration of the polymer is not lower than 100 mg/L, preferably, 100 to 10,000 mg/L and, more preferably, 300 to 3,000 mg/L. If the concentration of the polymer is lower than 100 mg/L, the film is not formed to a sufficient degree. If the concentration of the polymer exceeds 10,000 mg/L, the cost increases.

The organic/inorganic composite surface-treating solution contains the zirconium compound in an amount of 100 to 10,000 mg/L and, preferably, 300 to 1,000 mg/L calculated as zirconium. If the content thereof is smaller than 100 mg/L, the zirconium film is not formed in a sufficient amount through the treatment of a short period of time, and the close adhesion and corrosion resistance may decrease. Even if the content thereof exceeds 10,000 mg/L, properties are not improved, treating time is not shortened, and cost may increase.

The organic/inorganic composite surface-treating solution contains the phosphorus compound in an amount of 100 to 10,000 mg/L and, preferably, 300 to 1,000 mg/L calculated as phosphorus. If the content thereof is smaller than 100 mg/L, the phosphorus film is not formed in a suitable amount in the film that is being formed, and the adhesion may decrease. Even if the content thereof exceeds 10,000 mg/L, phosphorus simply exists in an excess amount without contributing to improving the close adhesion or the corrosion resistance, and cost may increase.

It is desired that the organic/inorganic composite surface-treating solution has a pH in a range of 2.5 to 5.5 and, particularly, 2.8 to 4.0. If the pH is smaller than 2.5, the metal surface is etched excessively, and the film exhibits defective appearance and poor corrosion resistance. On the other hand, if pH exceeds 5.5, the forming reaction does not proceed to a satisfactory degree and the film is formed little.

As required, further, the organic/inorganic composite surface-treating solution may contain an etching assistant, a chelating agent and a pH-adjusting agent in addition to the above-mentioned components.

As the etching assistant, there can be exemplified hydrogen peroxide, hydrofluoric acid, hydrofluorate and fluoroboric acid. When a complex of zirconium exemplified as the water-soluble zirconium compound is used as a source of supplying fluorine ions, fluorine ions are not formed in sufficient amounts and it is desired to use the above fluorine compound in combination.

As the chelating agent, there can be exemplified such acids as citric acid, tartaric acid and gluconic acid that form complexes with aluminum, and metal salts thereof.

As the pH-adjusting agent, there can be exemplified acids such as phosphoric acid, condensed phosphoric acid, hydrofluoric acid, nitric acid, perchloric acid, sulfuric acid, sodium nitrate, ammonium hydroxide, sodium hydroxide and ammonia, or bases, that do not adversely affect the surface treatment.

[Organic/Inorganic Composite Surface-Treating Layer II]

The organic/inorganic composite surface-treating layer II contains the zirconium compound and/or the titanium compound in an amount of 4 to 30 mg/m$^2$ calculated as zirconium atoms and/or titanium atoms, contains the organic phosphonic acid compound in an amount of 0.2 to 9 mg/m$^2$ calculated as phosphorus atoms, and contains the tannin in an amount of 2 to 90 mg/m$^2$ calculated as carbon atoms.

Though there is no particular limitation on the zirconium compound that is used for the organic/inorganic composite surface-treating layer II provided it contains zirconium, it is desired to use a water-soluble zirconium compound containing fluorine since it exhibits good stability at the above pH value and is capable of excellently forming the film.

There is no particular limitation on the water-soluble zirconium compound that contains fluorine, and there can be exemplified $H_2ZrF_6$, $(NH_4)_2ZrF_6$, $K_2ZrF_6$, $Na_2ZrF_6$ and $Li_2ZrF_6$, which may be used in a single kind or in two or more kinds in combination.

Though there is no particular limitation on the titanium compound provided it contains titanium, it is desired to use a water-soluble titanium compound containing fluorine since it exhibits good stability at the above pH value and is capable of excellently forming the film.

There is no particular limitation on the water-soluble titanium compound that contains fluorine, and there can be exemplified $H_2TiF_6$, $(NH_4)_2TiF_6$, $K_2TiF_6$ and $Na_2TiF_6$ which may be used in a single kind or in two or more kinds in combination.

It is desired that the content of the zirconium compound and/or the titanium compound in the surface-treating film is in a range of 4 to 30 mg/m$^2$ and, particularly, 7 to 25 mg/m$^2$ calculated as zirconium atoms and/or titanium atoms. If the content thereof is less than 4 mg/m$^2$, the adhesion and corrosion resistance of the treating film may decrease. If the content thereof exceeds 30 mg/m$^2$, on the other hand, the adhesion of the treating film may decrease. Besides, properties are not improved and cost may increase. The content of the zirconium compound and/or the titanium compound stands for a total content of zirconium and titanium that are contained in the above organic/inorganic composite surface-treating film.

The organic/inorganic composite surface-treating layer II contains an organic phosphonic acid compound.

The organic phosphonic acid compound stands for an organic compound that has a phosphonic group (—OP$_3$H$_2$) in the compound and, desirably, is a compound in which a phosphonic group (—PO$_3$H$_2$) is bonded to a carbon atom in the compound.

Among the organic phosphonic acid compounds, there is no particular limitation on the compound in which the phosphonic group (—PO$_3$H$_2$) is bonded to the carbon atom in the compound. Examples thereof include aminotri(methylenephosphonic acid), 1-hydroxyethylidene-1,1-diphosphonic acid, and 2-phosphobutanone 1,2,4-tricarboxylic acid.

As the organophosphonic acid compound, further, there can be exemplified ethylenediaminetetra(methylenephosphonic acid) and diethylenetriaminepenta(methylenephosphonic acid).

Among the organic phosphonic acid compounds, it is desired to use aminotri(methylenephosphonic acid), 1-hydroxyethylidene-1,1-diphosphonic acid, and 2-phosphobutanone 1,2,4-tricarboxylic acid from the standpoint of film-precipitating property, corrosion resistance after the film has been formed and close adhesion of the film.

It is desired that the organic phosphonic acid compound is soluble in water. When the compound is soluble in water, there is no need of using an organic solvent, and the load against the environment can be reduced.

The organic phosphonic acid compounds may be used in a single kind or in two or more kinds in combination. It is not desired that the organic/inorganic composite surface-treating film contains an organic phosphonic acid compound salt in which a hydrogen atom in the phosphonic group is substituted by an alkali metal or ammonium, since the film that is formed exhibits a decreased corrosion resistance.

It is desired that the content of the organic phosphonic acid compound in the organic/inorganic composite surface-treating layer is in a range of 0.2 to 9 mg/m$^2$ and, particularly, 0.6 to 3 mg/m$^2$ calculated as phosphorus atoms. If the content thereof is smaller than the above range, the adhesion of the treated film may decrease. Even if the content thereof exceeds the above range, phosphorus simply exists in an excess amount without contributing to improving the close adhesion, and cost may increase.

The organic/inorganic composite surface-treating layer II contains a tannin.

The tannin is also called tannic acid and is a general term for aromatic compounds of complex structures having numerous phenolic hydroxyl groups that are widely distributed in the plant kingdom. The tannin may be either of the hydrolyzing type or the condensing type.

As the tannin, there can be exemplified hamameli tannin, tannin of persimmon, tea tannin, Chinese tannin, Turkish gallotannin, myrobalan tannin, divi-divi tannin, algarobilla tannin, valonia tannin and catechin tannin. The tannin may be a tannin-decomposed product obtained by decomposing the tannin present in a plant by such a method as hydrolysis.

As the tannin, there can be used those placed in the market, such as "Tannic Acid Extract A", "B Tannic Acid", "N Tannic Acid", "Industrial Tannic Acid", "Refined Tannic Acid", "Hi Tannic Acid", "F Tannic Acid", "Pharmacopoeial Tannic Acid" (all of which are produced by Dainihon Seiyaku Co), and "Tannic Acid=AL" (produced by Fuji Kagaku Kogyo Co.). Tannins may be used in a single kind or in two or more kinds in combination.

It is desired that the tannin has a number average molecular weight of not smaller than 200. If a tannin-decomposed product is used as the tannin, the decomposition may proceed excessively forming a low molecular compound having a molecular weight of smaller than 200. In this case, properties of the tannin are not exhibited, and adhesion of the film may not be improved after the film has been formed.

It is desired that the content of tannin in the organic/inorganic composite surface-treating layer II is in a range of 2 to 90 mg/m$^2$ and, particularly, 6 to 30 mg/m$^2$ calculated as carbon atoms. If the content thereof is smaller than the above range, the adhesion of the treating film may decrease. If the content thereof exceeds the above range, on the other hand, the treating film exhibits decreased adhesion and corrosion resistance.

The amounts of zirconium and titanium in the zirconium compound and/or in the titanium compound, and the amount of phosphorus in the organic phosphonic acid compound in the organic/inorganic composite surface-treating layer II, can be measured by using a fluorescent X-ray analyzer, and the amount of tannin can be measured relying upon the amount of organic carbon measured by using a multiphase carbon/moisture analyzer.

The organic/inorganic composite surface-treating layer II is obtained by applying the organic/inorganic composite surface-treating solution onto the aluminum alloy sheet.

The organic/inorganic composite surface-treating solution is prepared by dissolving the zirconium compound and/or the titanium compound, the organic phosphonic acid and the tannin in a solvent.

It is desired that the organic/inorganic composite surface-treating solution contains the zirconium compound and/or the titanium compound in an amount of 40 to 1,000 ppm and, particularly, 100 to 300 ppm calculated as the amounts of zirconium and/or titanium on the basis of mass. If the content thereof is smaller than 40 ppm, the zirconium film or the titanium film is not formed in a sufficient amount through the treatment of a short period of time, and the close adhesion and corrosion resistance may decrease. If the content thereof exceeds 1,000 ppm, the adhesion decreases without contributing to improving the properties or shortening the treating time, and cost may increase. The content of the water-soluble zirconium compound and/or the water-soluble titanium compound stands for a total content of zirconium and titanium contained in the non-chromium metal surface-treating agent.

It is desired that the organic/inorganic composite surface-treating solution contains the organic phosphonic acid compound in an amount in a range of 20 to 500 ppm and, particularly, 50 to 200 ppm. If the content is less than 20 ppm, it is impossible to form the film which has a suitable amount of phosphorus compound and the adhesion may decrease. Even if the content thereof exceeds 500 ppm, the organic phosphonic acid compound simply exists in an excess amount without contributing to improving the adhesion and corrosion resistance, and the cost may increase.

It is desired that the organic/inorganic composite surface-treating solution contains the tannin in an amount in a range of 200 to 5,000 ppm and, particularly, 500 to 2,000 ppm on the basis of mass. If the content is less than 200 ppm, it is impossible to form the film which has a suitable amount of carbon compound and the corrosion resistance and adhesion may decrease. Even if the content thereof exceeds 5,000 ppm, no improvement is recognized in the corrosion resistance and adhesion, the treating time is not shortened and the cost may increase.

It is desired that the organic/inorganic composite surface-treating solution has a pH in a range of 1.6 to 4.0, preferably, 1.8 to 3.4, and more preferably, 2.2 to 2.8. If the pH is less than 1.6, the metal surface is etched excessively and the film exhibits defective appearance and poor corrosion resistance. If the pH exceeds 4.0, the forming reaction does not proceed to a satisfactory degree, and the film is formed less.

The organic/inorganic composite surface-treating solution may further contain, as required, an etching assistant, a chelating agent and a pH-adjusting agent in addition to the above-mentioned components.

As the etching assistant, there can be exemplified hydrofluoric acid, hydrofluorate and fluoroboric acid. When a complex of zirconium or titanium exemplified as the water-soluble zirconium compound or the titanium compound is used as a source of supplying fluorine ions, fluorine ions are not formed in sufficient amounts and it is desired to use the above fluorine compound in combination.

As the chelating agent, there can be exemplified such acids as citric acid, tartaric acid and gluconic acid that form complexes with aluminum, and metal salts thereof.

As the pH-adjusting agent, there can be exemplified acids such as nitric acid, perchloric acid, sulfuric acid, sodium nitrate, ammonium hydroxide, sodium hydroxide and ammonia that do not adversely affect the surface treatment.

(Forming the Organic/Inorganic Surface-Treating Layer)

In forming either the organic/inorganic composite surface-treating layer I or the organic/inorganic composite surface-treating layer II, the surface of the aluminum base sheet is washed and dewaxed by a conventional method prior to forming the organic/inorganic composite surface-treating layer. Concretely, it is desired to successively conduct the steps of washing with an alkaline detergent, washing with water, washing with an acid, washing with water, organic/inorganic composite surface treatment, washing with water and drying.

The organic/inorganic composite surface-treating layer is formed by bringing the above-mentioned treating solution into contact with the surface of the aluminum base sheet so as to react with the surface thereof. Though not limited thereto only, the treating solution can be contacted to the aluminum base sheet by a known method such as roll-coating method, spray method or dipping method.

Here, it is desired that the treatment is conducted at a temperature in a range of 30 to 80° C. for 1 to 20 seconds. If the temperature is lower than the above range, the reaction rate decreases and the film precipitates poorly. Therefore, an extended period of time is required for forming the film in a sufficient amount and the productivity decreases. If the temperature is higher than the above range, on the other hand, the energy loss tends to increase.

After the treatment, it is preferable to wash with water and drying. By heating and drying at a temperature in a range of 40 to 120° C. for 6 to 60 seconds, the organic polymer acquires increased molecular weights on the surfaces. When higher corrosion resistance is required, the drying temperature is selected to be not lower than 180° C. to increase the degree of polymerization on the surfaces.

(Primer)

The primer used in the invention for applying the polyester film contains a polyester resin containing not less than 30% by weight of a carboxyl group-introduced polyester resin, and a phenol resin at a weight ratio of 50:50 to 85:15 and, particularly, 65:35 to 75:25.

If the amount of the carboxyl group-introduced polyester resin becomes smaller than 30% by weight, the close adhesion decreases between the primer layer and the surface-treating layer, and between the primer layer and the polyester film. If the blended amount of the phenol resin is smaller than the above range of the blending ratio (weight ratio) of the polyester resin and the phenol resin, the primer is not cured to a sufficient degree and, therefore, the close adhesion and the corrosion resistance decrease. If the blended amount of the phenol resin is larger than the above range, on the other hand, the primer layer becomes brittle, and a breakage occurs on the interface between the primer layer and the surface-treating layer at the time of working the polyester film-coated metal sheet. In this case, too, therefore, the close adhesion and the corrosion resistance decrease.

[Carboxyl Group-Introduced Polyester Resin]

The polyester resin is obtained by the ring-opening addition reaction of the polyester with a compound having a carboxylic acid anhydride group. The compound used for the ring-opening addition reaction contains at least a carboxylic polyanhydride. The polyester resin has a resin acid value of 150 meq/kg to 800 meq/kg and a number average molecular weight of 5,000 to 100,000 calculated as that of styrene.

If the resin acid value is smaller than the above range, the polyester resin used in the invention disperses little, and preservation of the dispersion thereof becomes unstable. If the resin acid value is larger than the above range, on the other hand, the retort resistance decreases. Further, if the number average molecular weight of the polyester resin calculated as that of styrene is smaller than the above range, the primer layer becomes brittle exhibiting decreased workability and retort resistance. If the number average molecular weight thereof is larger than the above range, the coating workability decreases.

As the carboxylic acid component used for the polyester resin, there can be used aromatic dicarboxylic acids such as terephthalic acid, isophthalic acid, orthophthalic acid and naphthalenedicarboxylic acid; aliphatic dicarboxylic acids such as succinic acid, glutaric acid, adipic acid, azelaic acid, sebacic acid, dodecanedioic acid and dimeric acid; unsaturated dicarboxylic acid such as (anhydrous) maleic acid, fumaric acid and terpene/maleic acid adduct; alicyclic dicarboxylic acid such as 1,4-cyclohexanedicarboxylic acid, tetrahydrophthalic acid, hexahydroisophthalic acid and 1,2-cyclohexenedicarboxylic acid; trivalent or more highly valent carboxylic acids such as (anhydrous) trimellitic acid, (anhydrous) pyromellitic acid and methylcyclohexenetricarboxlic acid; and monocarboxylic acids such as 4,4-bis(4'-hydroxyphenyl)-pentanoic acid, 4-mono(4'-hydroxyphenyl)pentanoic acid and p-hydroxybenzoic acid, from which any one or two or more kinds of them may be selected and used.

As the polyhydric alcohol component used for the polyester resin, there can be used aliphatic glycols such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol and 1,9-nonanediol; ether glycols such as diethylene glycol, triethylene glycol, polyethylene glycol, polypropylene glycol and polytetramethylene glycol; alicyclic polyalcohols such as 1,4-cyclohexanedimethanol, 1,3-cyclohexanedimethanol, 1,2-cyclohexanedimethanol, tricyclodecane glycols and hydrogenated bisphenols; and trivalent or more highly valent polyalcohols such as trimethylolpropane, trimethylolethane and pentaerythritol, from which one or more of them may be selected and used.

Among the compounds having the carboxylic anhydride group, the carboxylic polyanhydride undergoes the ring-opening addition reaction with the polyester resin to impart a pendant-like structure having a divalent carboxyl group in the polyester resin molecular chain.

As the carboxylic acid polyanhydride among the compounds having a carboxylic anhydride group in the molecules that undergo the ring-opening addition reaction with the polyester resin, there can be exemplified anhydrous pyromellitic acid, 1,2,3,4-butanetetracarboxylic dianhydride, 1,2,3,4-pentanetetracarboxylic dianhydride, 3,3',4,4'-benzophenonetetracarboxylic dianhydride, cyclopentanetetracarboxylic dianhydride, 2,3,6,7-naphthalenetetracarboxylic dianhydride, 1,2,5,6-naphthalenetetracarboxylic dianhydride, ethylene glycol bistrimellitate dianhydride, 2,2',3,3'-diphenyltetracarboxylic dianhydride, thiophene-2,3,4,5-tetracarboxylic dianhydride, ethylenetetracarboxylic dianhydride, 4,4'-oxydiphthalic dianhydride, and 5-(2,5-dioxotetrahydro-3-furanyl)-3-methyl-3-cyclohexene-1,2-dicarboxylic anhydride, from which one or two or more of them may be selected and used. Among the above carboxylic polyanhydrides, the ethylene glycol bistrimellitic dianhydride is most preferably used.

As the carboxylic monoanhydride among the compounds having the carboxylic anhydride group in the molecules that undergo the ring-opening addition reaction with the polyester resin, there can be exemplified monoanhydrides such as phthalic anhydride, succinic anhydride, maleic anhydride, trimellitic anhydride, itaconic anhydride, citraconic anhydride, and 5-(2,5-dioxotetrahydrofurfuryl)-3-cyclohexene-1,2-dicarboxylic anhydride, as well as hexahydrophthalic anhydride and tetrahydrophthalic anhydride, from which one or two or more of them may be selected and used.

There is no particular limitation on the method of obtaining the polyester resin used as the primer by adding a compound having a carboxylic anhydride group in the molecules thereof, and a known method can be employed.

It is desired that the compound having the carboxylic anhydride group in the molecules that undergoes the ring-opening addition reaction with the polyester resin, comprises not less than 10 mol % of a carboxylic polyanhydride in 100 mol % of the whole amount thereof and a carboxylic monoanhydride other than the above. If the amount of the carboxylic polyanhydride is less than 10 mol %, dispersion of the polyester resin is not improved, the polyester molecular chain does not acquire high molecular weights and the workability decreases.

It is further desired that the polyester resin has a glass transition temperature (Tg) in a range of 0° C. to 120° C. and, particularly, 40° C. to 100° C.

[Phenol Resin]

It is desired that the phenol resin is of the resole type.

More preferably, the resole type phenol resin is a copolymer of a formaldehyde and a phenol compound which contains not less than 50% by mass of a trifunctional or more highly functional phenol compound.

As the trifunctional or more highly functional phenol compound, there can be exemplified phenol, m-cresol, m-ethylphenol, 3,5-xylenol, m-methoxyphenol, bisphenol A and bisphenol F, which can be used in one kind or in two or more kinds in combination. It is particularly desired to use the m-cresol.

In addition to the above phenol compound, there can be further added a bifunctional phenol compound such as o-cresol, p-cresol, p-tert-butylphenol, p-ethylphenol, 2,3-xylenol or 2,5-xylenol in an amount that does not deteriorate the properties, i.e., in an amount smaller than 50% by mass to the starting material of the cresol type phenol resin used in the present invention.

The resole type phenol resin is obtained by methylolating the phenol resin containing not less than 50% by mass of the trifunctional or more highly functional phenol compound with formaline, paraformaldehyde or trioxane.

[Preparation of the Primer]

The primer used in the present invention can be prepared by blending the carboxyl group-introduced polyester resin and the phenol resin at a weight ratio of 50:50 to 85:15 and, particularly, 65:35 to 75:25 being dissolved in an organic solvent.

Here, it is desired that the acid catalyst is contained as a curing catalyst in an amount of 0.01 part by mass to 3 parts by mass in 100 parts by mass of the whole resin components (a combination of the polyester resin and the phenol resin). As the acid catalyst, there can be exemplified sulfuric acid, p-toluenesulfonic acid, dodecylbenzenesulfonic acid, naphthalenesulfonic acid, dinonynaphthalenesulfonic acid, dinonylnaphthalenedisulfonic acid, camphor-sulfonic acid, phosphoric acid, and the one obtained by blocking any one of the above acids with amine (amine is added to neutralize part of the acid), which may be used in one kind or in a combination of two or more kinds. Among these acid catalysts, it is particularly desired to use the dodecylbenzenesulfonic acid and the dodecylbenzenesulfonic acid blocked with an amine from the standpoint of compatibility with the resin and sanitation.

It is desired that the organic solvent has the effect of plasticizing the polyester resin and amphipatic property. Examples thereof include alcohols such as ethanol, n-propanol, isopropanol, n-butanol, isobutanol, sec-butanol, tert-butanol, isoamyl alcohol, sec-amyl alcohol, tert-amyl alcohol, n-hexanol and cyclohexanol; ketones such as methyl ethyl ketone, methyl isobutyl ketone and ethyl butyl ketone; cyclic ethers such as tetrahydrofurane, dioxane and 1,3-dioxolane; glycol derivatives such as ethylene glycol, ethylene glycol monomethyl ether, ethylene glycol monoethyl ether, ethylene glycol monobutyl ether, ethylene glycol monoethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether and propylene glycol methyl ethyl acetate; 3-methoxy-3-methyl butanol, 3-methoxybutanol, acetonitrile, dimethylformamide, dimethylacetamide, diacetone alcohol and ethyl acetoacetate.

As required, thereafter, the organic solvent used for dissolving the polyester resin can be distilled off by heating or under a reduced pressure. It is desired that the organic solvent is distilled off under a reduced temperature at a temperature of not higher than 100° C. and, more preferably, not higher than 80° C. in order to suppress the condensation of the resole type phenol resin by the heat of during the distillation of the organic solvent. Here, a completely aqueous resin composition can be obtained if the organic solvent is distilled off in whole amount. From the standpoint of stability of the dispersion and the film formability, however, it is desired that the organic solvent is contained in an amount of 3% by mass to 20% by mass.

The primer can be applied by a known method such as roll-coating method, spray method, dipping method or brush-applying method. Though there is no particular limitation on the thickness of the coating, it is desired that the thickness is, usually, in a range of 0.3 μm to 3 μm in a dry state. The coating is baked under the conditions of, desirably, a temperature of 80° C. to 150° C. for 5 seconds to 1 minute.

(Polyester Film)

The polyester film which is a resin used for the resin-coated metal sheet for producing an easy-open end of the invention is a film made of the polyester resin.

The polyester resin may be a homopolyethylene terephthalate, or a copolymerized polyester containing an acid component other than the terephthalic acid in an amount of not more than 30 mol % on the basis of the acid component or containing not more than 30 mol % of the alcohol component other than the ethylene glycol on the basis of the alcohol component, or a blend thereof.

As the acid component other than the terephthalic acid, there can be exemplified isophthalic acid, naphthalenedicarboxylic acid, cyclohexanedicarboxylic acid, p-β-oxyethoxybenzoic acid, diphenoxyethane-4,4'-dicarboxylic acid, 5-sodiumsulfoisophthalic acid, hexahydroterephthalic acid, succinic acid, adipic acid, sebacic acid, dodecanedioic acid, dimeric acid, trimellitic acid and pyromellitic acid.

As the alcohol component other than the ethylene glycol, there can be exemplified propylene glycol, 1,4-butanediol, neopentyl glycol, 1,6-hexylene glycol, diethylene glycol, triethylene glycol, cyclohexanedimethanol, ethylene oxide adduct of bisphenol A, trimethylolpropane and pentaerythritol.

The polyester must have a molecular weight in a range of forming a film, and should desirably have an intrinsic viscosity [η] of not smaller than 0.5 and, particularly, in a range of 0.52 to 0.70 as measured by using a phenol/tetrachloroethane mixed solvent and should further have a glass transition point of not lower than 50° C. and, particularly, in a range of 60° C. to 80° C. from the standpoint of barrier properties against the corrosive components and mechanical properties.

Desirably, the polyester is any one of polyethylene terephthalate, polyethylene terephthalate copolymerized with isophthalic acid, polyethylene terephthalate copolymerized with naphthalene dicarboxylic acid, or a blend of polyethylene terephthalate and polybutylene terephthalate.

The polyester film may be blended with a known blending agent for films, lubricating agent, anti-blocking agent, pigment, antistatic agents and antioxidant according to a known recipe.

The polyester film may not be drawn but is desirably biaxially drawn. When biaxially drawn, the polyester film is usually, drawn 3 to 5 times in the transverse direction and 3 to 5 times in the longitudinal direction. It is further desired that the polyester film has a thickness, usually, in a range of 10 to 40 μm.

In the present invention, the polyester film may be positioned as the surface layer on the inner surface side of the easy-open end of a two-layer constitution which is forming a lower layer on the side of the metal sheet.

Any one of the above polyester resins can be used as the lower layer. Particularly, the lower layer is made of a polyester resin comprising an ethylene terephthalate unit as a chief material containing at least any one of isophthalic acid, naphthalenedicarboxylic acid or the like in an amount of 1 to 30 mol %, and containing the acid component in an amount larger than the amount of the acid component in the polyester film forming the upper layer, from the standpoint of work adhesion and dent resistance.

When the two-layer constitution is employed, it is desired that the lower layer has a thickness in a range of 5 to 32 μm and the thickness ratio of the upper layer and the lower layer is in a range of 1:1 to 1:4 from the standpoint of workability and corrosion resistance.

(Polyester Film-Coated Surface-Treated Aluminum Sheet)

Figure 1:
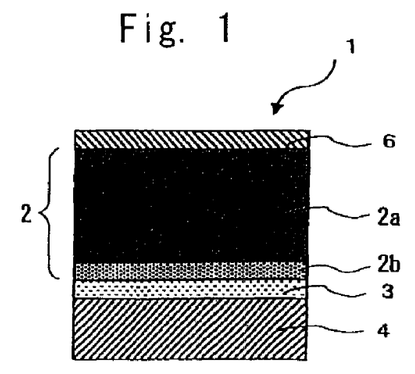
FIG. 1 is a sectional view illustrating a polyester film-coated surface-treated aluminum sheet used in the present invention.

FIG. 1 is a view illustrating a sectional structure of a polyester film-coated surface-treated aluminum sheet used for producing an easy-open end of the present invention. The polyester film-coated surface-treated aluminum sheet of the invention generally designated at 1 comprises a surface-treated aluminum base sheet 2 having an organic/inorganic composite surface-treating layer 2b formed on the surface of an aluminum base sheet 2a, a polyester film 4 formed, via a primer layer 3, on the surface of the organic/inorganic composite surface-treating layer 2b of the surface-treated aluminum base sheet 2 on the side that becomes the inner surface of the easy-open end, and a protection coating 6 formed on the surface of the surface-treated aluminum sheet 2 on the side that becomes the outer surface of the easy-open end.

Figure 2:
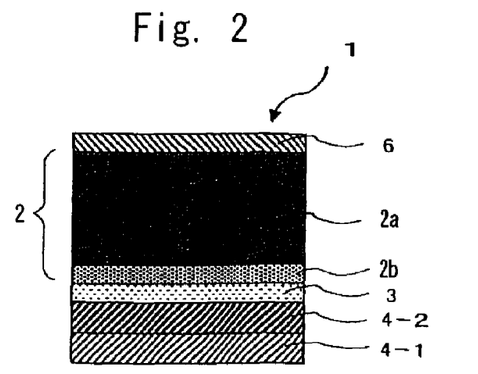
FIG. 2 is a sectional view illustrating another polyester film-coated surface-treated aluminum sheet used in the present invention.

FIG. 2 illustrates another example of the polyester film-coated surface-treated aluminum sheet of FIG. 1 in which the polyester film 4 is of a two-layer structure including an upper layer 4-1 and a lower layer 4-2 on the side of the primer layer 3, and a protection coating 6 is formed on the surface of the surface-treated aluminum sheet 2 on the side that becomes the outer surface of the easy-open end.

The polyester film-coated surface-treated aluminum sheet used in the present invention is obtained by forming the polyester film in advance by a known method, and laminating the polyester film on the surface-treated aluminum base sheet to which the primer has been applied, or by applying the primer onto the polyester film which is, then, laminated on the metal sheet. The organic/inorganic surface-treating layer, primer and polyester film may further be formed on the surface of the aluminum base sheet that becomes the outer surface of the end.

(Easy-Open End)

The easy-open end of the present invention may assume any known shape but that the surface of the polyester film-coated surface-treated aluminum sheet on where the polyester film is formed becomes the inner surface side of the end, and may be either the full-open type or the partial type.

To form the easy-open end, first, the resin-coated metal sheet is punched into the shape of a disk through a press-forming step to form the end of a desired shape. Next, by using a score die in a score-engraving step, a score is engraved from the outer surface side of the end on the way up to the middle of the thickness of the metal blank. By using a rivet-forming die in a rivet-forming step, a rivet is formed to protrude outward on a to-be-opened portion sectionalized by the score. In a tab-attaching step, a tab for opening is fitted to the rivet and is fixed by the protruded portion of the rivet to thereby form the easy-open end.

Figure 3:
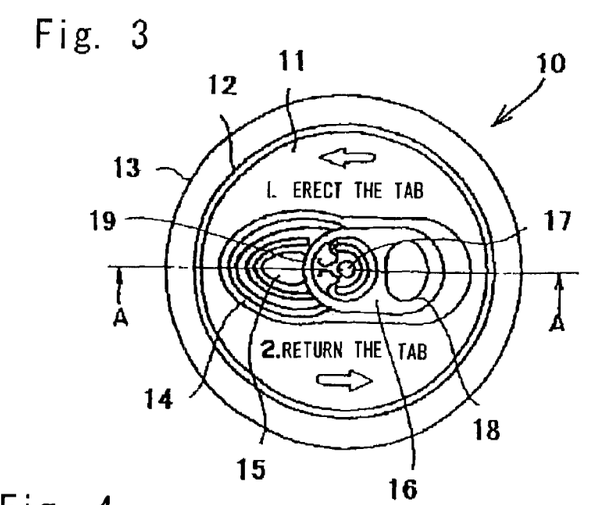
FIG. 3 is a top view of an easy-open end of the present invention.
Figure 4:
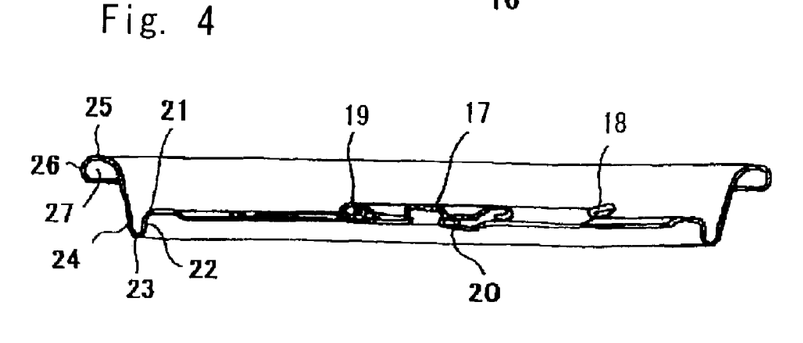
FIG. 4 is an enlarged sectional view along A-A in FIG. 3.

FIGS. 3 and 4 illustrate an easy-open end of the partial type which is one of the easy-open ends of the present invention. FIG. 3 is a top view and FIG. 4 is a sectional view along the line A-A in FIG. 3.

The easy-open end of the present invention generally designated at 10 is constituted by a central panel portion 11, a reinforcing annular groove 12 and an outermost circumferential wrap-seamed portion 13. The central panel portion 11 has a to-be-opened portion 15 surrounded by the score 14, and a tab 16 for opening is fixed via a rivet 17. The tap 16 for opening includes a grip ring 18, an end 19 for push-in and a tongue piece 20 for fixing the rivet, the end 19 for push-in being so attached as to be overlapped on the to-be-opened portion 15. The reinforcing annular groove 12 comprises an inner wall portion 22, a radius portion 23 and an outer wall portion (chuck wall) 24 in this order from the central panel portion 11 via a central panel radius portion 21, and the outer wall portion 24 is connected to a seaming panel portion 25 and to a curled portion 26. The back sides of the seaming panel portion 25 and the curled portion 26 are forming a groove 27 which is lined with a sealing composition (not shown), and a sealing is accomplished by the double seaming with the can wall flange (not shown).

EXAMPLES

The invention will be described more concretely by way of Examples to which only, however, the invention is in no way limited. In Examples, further, "parts" are all "by mass" unless stated otherwise.
(Preparation of Surface-Treating Agents)
[Surface-Treating Solution A]
1. Preparation of a Polymer.
In the water-soluble polymer represented by the above formula (1), X was a hydrogen atom or $Z=-CH_2N(CH_3)_2$, the introduction ratio of the groups Z was 0.5 groups per a benzene ring, and when Xs were all hydrogen atoms, the polymer possessed an average molecular weight of 3,000.
Calculation of Introduction Ratio of the Groups Z.
Elements C, H, N and S contained in the polymer prepared above were determined by using an element analyzer, Model EA1108 manufactured by FISONS Co. The introduction ratio of the groups Z was calculated from the determined results.
2. Preparation of a Treating Solution.
Ion-exchanged water of a normal temperature was fed into a vessel equipped with a stirrer. To the vessel were further added 71 g/L of 40% zirconium hydrofluoric acid (containing Zr in an amount of 17.6%), 15 g/L of 85% phosphoric acid, and 9 g/L of 55% hydrofluoric acid at normal temperature with stirring. Next, 40 g/L of the above polymer was dissolved therein with stirring. Thereafter, the solution was diluted to 4% with the ion-exchanged water and ammonia was added thereto to adjust the pH to 3.0 to thereby obtain a pale yellowish aqueous solution (surface-treating solution A).
[Surface-Treating Solutions B to F]
Surface-treating solutions B to F were obtained in the same manner as the preparation of the surface-treating solution A but by varying the zirconium component, phosphorus component, polymer concentration, pH, average molecular weight of the polymer and the introduction ratio of the groups Z of the polymer as shown in Table 1.
[Surface-Treating Solution G]
9956.3 Grams of the ion-exchanged water was fed into a vessel equipped with a stirrer. 11.5 Grams of the zirconium hydrofluoric acid (containing Zr in an amount of 17.6%) was gradually added thereto at normal temperature with stirring. Further, 4.2 grams of a 1-hydroxyethylidene-1,1-diphosphonic acid was gradually added thereto with stirring. Next, 28 grams of a tannic acid (containing nonvolatile component in an amount of 50%) was gradually added thereto with stirring. Thereafter, the hydrofluoric acid was added with stirring such that the concentration of free fluorine was 12 ppm with respect to the treating agent and, then, ammonia was added to adjust the pH of the treating agent to be 2.6. After continuously stirred for 10 minutes, a slightly brown aqueous solution (surface-treating solution G) was obtained containing zirconium hydrofluoric acid at a concentration of 200 ppm as zirconium, containing 1 hydroxyethylidene-1,1-diphosphonic acid at a concentration of 120 ppm as phosphorus and containing tannin at a concentration of 1400 ppm.
[Surface-Treating Solution H]
9960.5 Grams of the ion-exchanged water was fed into a vessel equipped with a stirrer. 7.3 Grams of the titanium hydrofluoric acid (containing Ti in an amount of 29.3%) was gradually added thereto at normal temperature with stirring. Further, 4.2 Grams of the 1-hydroxyethylidene-1,1-diphosphonic acid was gradually added thereto with stirring. Next, 28 grams of the tannic acid (containing nonvolatile component in an amount of 50%) was gradually added thereto with stirring. Thereafter, the hydrofluoric acid was added with stirring such that the concentration of free fluorine was 12 ppm with respect to the treating agent and, then, ammonia was added to adjust the pH of the treating agent to be 2.6. After continuously stirred for 10 minutes, a slightly brown aqueous solution (surface-treating solution H) was obtained containing titanium hydrofluoric acid at a concentration of 220 ppm as titanium, containing 1-hydroxyethylidene-1,1-diphosphonic acid at a concentration of 120 ppm as phosphorus and containing tannin at a concentration of 1400 ppm.
(Washing of the Aluminum Alloy Sheet)
An aluminum/magnesium alloy sheet (JIS 5021, sheet thickness: 0.25 mm) placed in the market was sprayed with a strongly alkaline dewaxing agent (Fine Cleaner 4377 produced by Nihon Parkalizing Co.) placed in the market under the conditions of a concentration thereof of 20 g/L, treating temperature of 60° C. and a treating time of 7 seconds. Thereafter, the alkali component remaining on the surfaces was washed with the tap water.
(Surface Treatment of the Aluminum Alloy Sheet)
The obtained aluminum alloy sheets were treated for their surfaces by being sprayed with the above surface-treating solutions A to H at a temperature of 50° C. to 60° C. for a treating time of 1 second to 5 seconds. Thereafter, the unreacted product was washed with tap water and was, further, washed with deionized water of not lower than 3,000,000 ohms followed by drying at 80° C. to obtain the surface-treated metal sheets forming the organic/inorganic composite surface-treating layer.
Measurement of the Amounts of Films.
The formed organic/inorganic composite surface-treating layer was measured for the amounts of adhesion ($mg/m^2$) of zirconium, titanium, chromium and phosphorus by using a fluorescent X-ray analyzer, XRF-1700, manufactured by Shimazu Mfg. Co. The amount of adhesion ($mg/m^2$) of carbon was measured by using a multiphase carbon/moisture analyzer, RC 412, manufactured by LECO Co., U.S.A. The sample size was 32 $cm^2$ and the measurement was taken under the conditions of 400° C. for 8 minutes. The results were as shown in Table 1.
(Preparation of Primers)
Preparation of the Carboxyl Group-Introduced Polyester Resin.
400 Parts of terephthalic acid, 400 parts of isophthalic acid, 500 parts of ethylene glycol, 500 parts of neopentyl glycol and 0.5 parts of titanium tetrabutoxide were fed into a four-way flask, and the temperature was gradually elevated up to 235° C. over 4 hours so as to be esterified. Thereafter, water was distilled off in a predetermined amount, the initial polymerization was conducted for 30 minutes under a reduced pressure, the temperature was further elevated up to 255° C. to conduct the polymerization for 80 minutes. After having confirmed that a target molecular weight was reached, the temperature was lowered down to 220° C. in a nitrogen atmosphere. Thereafter, 20 parts of an ethylene glycol bistrimellitic dianhydride and 20 parts of a trimellitic anhydride were thrown thereinto, and the mixture was stirred in a nitrogen atmosphere at 200° C. to 230° C. for one hour to obtain a desired polyester resin (polyester resin A). The polyester resin A was measured for its number average molecular weight calculated as that of the styrene by using the gel permeation chromatography (GPC) to be 12,000. Further, 1 g of the polyester resin A was dissolved in 100 cc of chloroform and was titrated with a 0.1 N KOH ethanol solution to measure the equivalent (acid value) per kilogram of the resin to be 380 meq/Kg.

Further, the polyester resin A and a polyester resin B (GK 880 produced by Toyobo Co., number average molecular weight: 18,000, acid value: 60 meq/Kg) into which no carboxyl group has been introduced were blended together to prepare a polyester resin C (polyester resin A:polyester resin B=30:70) and a polyester resin D (polyester resin A:polyester resin B=25:75).

500 parts by weight of m-cresol and 500 parts by weight of formalin were reacted together in the presence of a magnesium hydroxide catalyst, refined and dissolved in a solvent to prepare a resole type phenol formaldehyde resin solution.

The polyester resins A to D and the above resole type phenol formaldehyde resin were mixed at solid component weight ratios shown in Table 1, and a dodecylbenzenesulfonic acid was added thereto at a ratio of 0.5 parts by weight relative to the solid components to prepare primers.

(Preparation of Films)

A polyethylene terephthalate copolymerized with 11 mol % of an isophthalic acid and containing 0.1% by weight of a truly spherical silica particle having an average particle size of 1.5 µm and a particle size ratio of 1.0 to 1.2, was melt-extruded at 260 to 290° C., quickly cooled and solidified on a rotary drum to obtain an undrawn film which was, then drawn in the longitudinal direction into 3 to 5 times at 80 to 110° C. and was drawn in the transverse direction into 3 to 4 times at 90 to 130° C. Thereafter, the film was heat-set at 160 to 195° C. The film after drawn possessed a thickness of 30 µm.

Example 1

The primer of the polyester resin A/phenol formaldehyde resin of 70/30 was applied onto one surface of the film so that the amount of the solid component thereof was 10 mg/dm$^2$, and was dried in an oven heated at 100° C.

The surface-treated aluminum sheet prepared by using the surface-treating solution A was heated at 230° C. The polyethylene terephthalate resin film copolymerized with the isophthalic acid to which the above primer was applied was heat-laminated on the surface-treated aluminum sheet in a manner that the primer-coated surface was on the side of the aluminum sheet at a laminate roll temperature of 150° C. and a sheet traveling speed of 150 m/min. followed immediately by cooling with water to obtain an aluminum alloy sheet having a lamination on one surface thereof.

An epoxyurea coating material was applied (film thickness after drying was 3 µm) onto the surface where nothing has been laminated of the above aluminum alloy sheet that has the lamination on one surface thereof, and was baked at 185° C. for 10 minutes to obtain a material for an aluminum alloy can end.

The thus obtained blank for the resin-coated aluminum alloy can end was punched in a diameter of 68.7 mm in a direction in which the resin-coated surface was on the inner surface side of the end. Next, the outer surface side of the end was subjected to the score working (width of 22 mm, remaining thickness of score of 110 µm, score width of 20 µm) of the partially open type, riveting and attachment of tab for opening to thereby prepare the easy-open end.

Examples 2 and 3

Easy-open ends were prepared in the same manner as in Example 1 but varying the polyester/phenol ratio of the primer into values shown in Table 1.

Example 4

An easy-open end was prepared in the same manner as in Example 1 but using the polyester resin C (containing 30% by weight of the carboxyl group-introduced polyester resin) as the polyester resin of the primer.

Examples 5 and 6

Easy-open ends were prepared in the same manner as in Example 4 but varying the polyester/phenol ratio of the primer into values shown in Table 1.

Examples 7 to 11

Easy-open ends were prepared in the same manner as in Example 1 but using the surface-treating solutions B to F.

Example 12

An easy-open end was prepared in the same manner as in Example 1 but using the surface-treating solution G.

Example 13

An easy-open end was prepared in the same manner as in Example 1 but using the surface-treating solution H.

Comparative Examples 1 and 2

Easy-open ends were prepared in the same manner as in Example 1 but varying the polyester/phenol ratio of the primer into values shown in Table 1.

Comparative Examples 3 and 4

Easy-open ends were prepared in the same manner as in Example 4 but varying the polyester/phenol ratio of the primer into values shown in Table 1.

Comparative Example 5

An easy-open end was prepared in the same manner as in Example 1 but using the polyester resin D (containing 25% by weight of the carboxyl group-introduced polyester resin) as the polyester resin of the primer.

Comparative Example 6

An easy-open end was prepared in the same manner as in Example 1 but using the polyester resin B (containing no carboxyl group-introduced polyester resin) as the polyester resin of the primer.

Comparative Example 7

An easy-open end was prepared in the same manner as in Example 1 but using zirconium phosphate type treating agent (Arozin N-405 manufactured by Nihon Parkalizing Co.) as the surface-treating agent.

Comparative Example 8

An easy-open end was prepared in the same manner as in Example 1 but using the chromic phosphate type treating agent (Alchrome K702 manufactured by Nihon Parkalizing Co.) as the surface-treating agent.

(Method of Evaluation)

The easy-open ends obtained in Examples 1 to 13 and in Comparative Examples 1 to 8 were evaluated as described below to obtain the results as shown in Table 1.

1. Evaluation of Feathering (Close Adhesion).

The obtained easy-open ends were subjected to the retort sterilization treatment (at 130° C. for 50 minutes) and were really opened to evaluate the occurrence of feathering at the opened portions. Two hundred ends were evaluated for each kind, an average feathering length of 200 ends was calculated based on the maximum feathering lengths of the ends, and was evaluated as shown in Table 1 on the following basis. Products marked with ◯ and Δ were evaluated to be practically usable.

◯: An average feathering length was less than 1.0 mm.

Δ: An average feathering length was not less than 1.0 mm but was less than 1.5 mm.

X: An average feathering length was not less than 1.5 mm.

2. Evaluation of Openability.

The obtained easy-open ends were subjected to the retort sterilization treatment (at 130° C. for 50 minutes) and were evaluated for their openability. Two hundred ends were evaluated for each kind. The results of evaluation were expressed by the numbers of defective openings for example breakage of tab/numbers of openings as shown in Table 1.

3. Pack Testing.

Welded can bodies for foods in general were filled with a corn soup, double-seamed with the above easy-open ends according to a customary method, and were sterilized at 130° C. for 90 minutes. The cans were stored at 55° C. for 2 months in a state where the easy-open ends were on the lower side. Thereafter, the double-seamed portions were cut by using a can opener to separate the ends from the can bodies, and the inner surfaces of the ends were observed by using a microscope for the occurrence of corrosion and were evaluated. Fifty ends were evaluated for each kind, and the results of evaluation were as shown in Table 1. If corrosion was observed on even one of the ends, this was stated in Table 1.

TABLE 1

| | | | Surface treatment | | | | | |
|---|---|---|---|---|---|---|---|---|
| | | | | Organic polymer | | | | |
| | | Treating solution | Organic component | Ave. molecular weight (x being hydrogen) | Group Z introduction ratio (groups/benzene ring) | Film amount (mg/m²) | | |
| | | | | | | Zr | P | C |
| Ex. | 1 | A | Formura (1) | 3,000 | 0.5 | 10 | 5 | 35 |
| | 2 | | | | | | | |
| | 3 | | | | | | | |
| | 4 | | | | | | | |
| | 5 | | | | | | | |
| | 6 | | | | | | | |
| | 7 | B | | 1,000 | 0.3 | 10 | 5 | 16 |
| | 8 | C | | 10,000 | 0.7 | 10 | 5 | 42 |
| | 9 | D | | 100,000 | 1.0 | 10 | 5 | 58 |
| | 10 | E | | 3,000 | 0.5 | 2 | 1 | 5 |
| | 11 | F | | 3,000 | 0.5 | 20 | 10 | 60 |
| | 12 | G | tannin | 1,000 | — | 10 | 1.5 | 15 |
| | 13 | H | | 1,000 | | Ti10 | 1.5 | 15 |
| Comp. Ex. | 1 | A | Formura (1) | 3,000 | 0.5 | 10 | 5 | 35 |
| | 2 | | | | | | | |
| | 3 | | | | | | | |
| | 4 | | | | | | | |
| | 5 | | | | | | | |
| | 6 | | | | | | | |
| | 7 | zirconium phosphate treating agent (Alozin N-405) | | | | 8 | 4 | 0 |
| | 8 | chromic phosphate treating agent (Alchrome K702) | | | | Cr20 | 10 | 0 |

| | | Primer | | Evaluation of ends | | |
|---|---|---|---|---|---|---|
| | | Polyester resin Ratio of carboxyl group-introduced polyester (%) | Polyester/phenol ratio | Feathering | Openability | Pack test |
| Ex. | 1 | A 100 | A70/30 | ◯ | 0/200 | normal |
| | 2 | | A50/50 | ◯ | 0/200 | normal |
| | 3 | | A85/15 | ◯ | 0/200 | normal |
| | 4 | C 30 | C70/30 | Δ | 0/200 | normal |
| | 5 | | C50/50 | Δ | 0/200 | normal |
| | 6 | | C85/15 | Δ | 0/200 | normal |

TABLE 1-continued

|  |  |  |  |  |  |  |
|---|---|---|---|---|---|---|
|  | 7 | A 100 | A70/30 | ○ | 0/200 | normal |
|  | 8 |  |  | ○ | 0/200 | normal |
|  | 9 |  |  | ○ | 0/200 | normal |
|  | 10 |  |  | ○ | 0/200 | normal |
|  | 11 |  |  | ○ | 0/200 | normal |
|  | 12 |  |  | ○ | 0/200 | normal |
|  | 13 |  |  | ○ | 0/200 | normal |
| Comp. Ex. | 1 | A 100 | A45/55 | X | 0/200 | normal |
|  | 2 |  | A90/10 | X | 2/200 | rivet/score portion corroded |
|  | 3 | C 30 | C45/55 | X | 0/200 | normal |
|  | 4 |  | C90/10 | X | 8/200 | rivet/score portion corroded |
|  | 5 | D 25 | D70/30 | X | 0/200 | normal |
|  | 6 | B 0 | B70/30 | X | 21/200 | rivet/score portion corroded |
|  | 7 | A 100 | A70/30 | X | 35/200 | corroded nearly over the whole surface |
|  | 8 |  |  | X | 62/200 | corroded nearly over the whole surface |

The invention claimed is:

1. An easy-open end having a score and a rivet, and having a polyester film applied, via a primer, onto an inner surface of an end of an aluminum base sheet on which a surface-treating layer has been formed, said surface-treating layer containing a zirconium compound and/or a titanium compound and an organic compound, wherein said primer is composed of a polyester resin and a phenol resin in the range from a weight ratio of polyester resin:phenol resin of 50:50 to 85:15, said polyester resin containing not less than 30% by weight of a carboxyl group-introduced polyester resin based on the weight of the polyester resin, said carboxyl group-introduced polyester resin is obtained by a ring-opening addition reaction of a compound having a carboxylic anhydride group with a polyester resin, the compound having a carboxylic anhydride group comprises carboxylic polyanhydride, and said carboxyl group-introduced polyester resin has not less than two carboxylic anhydride groups on a molecule thereof.

2. The easy-open end according to claim 1, wherein said carboxyl group-introduced polyester resin has an acid value of 150 to 800 meq/kg.

3. The easy-open end according to claim 1, wherein said phenol resin is an m-cresol resole phenol resin.

4. The easy-open end according to claim 1, wherein said surface-treating layer is an organic/inorganic composite surface-treating layer containing the zirconium compound in an amount of 2 to 20 mg/m² calculated as zirconium atoms, a phosphorus compound in an amount of 1 to 10 mg/m² calculated as phosphorus atoms, and the organic compound in an amount of 5 to 60 mg/m² calculated as carbon atoms, said organic compound is an organic polymer having a structural unit represented by the following formula (1), (1)

wherein φ is a benzene ring, and X is a hydrogen atom or a group Z represented by the following formula (2), (2)

wherein $R_1$ and $R_2$ are hydrogen atoms, alkyl groups having 1 to 10 carbon atoms or hydroxyalkyl groups having 1 to 10 carbon atoms, the introduction ratio of the groups Z being 0.3 to 1.0 groups per a benzene ring, and when Xs are all hydrogen atoms, said organic polymer has an average molecular weight of 1,000 to 100,000.

5. The easy-open end according to claim 1, wherein said surface-treating layer is an organic/inorganic composite surface-treating layer containing the zirconium compound and/or the titanium compound in an amount of 4 to 30 mg/m² calculated as zirconium atoms and/or titanium atoms, an organic phosphonic acid compound in an amount of 0.2 to 9 mg/m² calculated as phosphorus atoms, and a tannin in an amount of 2 to 90 mg/m² calculated as carbon atoms.

* * * * *